United States Patent
Kaplan

(10) Patent No.: US 12,273,738 B2
(45) Date of Patent: Apr. 8, 2025

(54) COMBATTING INTERFERENCE SIGNALS USING NULL STEERING IN WIRELESS COMMUNICATION NETWORKS

(71) Applicant: Infinidome Ltd., Caesarea (IL)

(72) Inventor: Moshe Kaplan, Pardes Hana-Karkur (IL)

(73) Assignee: Infinidome Ltd., Caesarea (IL)

( * ) Notice: Subject to any disclaimer, the term of this patent is extended or adjusted under 35 U.S.C. 154(b) by 487 days.

(21) Appl. No.: 17/708,024

(22) Filed: Mar. 30, 2022

(65) Prior Publication Data

US 2022/0330040 A1 Oct. 13, 2022

Related U.S. Application Data

(60) Provisional application No. 63/172,143, filed on Apr. 8, 2021.

(51) Int. Cl.
*H04W 16/28* (2009.01)
*H01Q 3/26* (2006.01)

(52) U.S. Cl.
CPC .......... *H04W 16/28* (2013.01); *H01Q 3/2611* (2013.01)

(58) Field of Classification Search
CPC .... H01Q 3/2611; H01Q 3/2605–2641; H04W 60/00; H04W 76/10; H04W 16/28
See application file for complete search history.

(56) References Cited

U.S. PATENT DOCUMENTS

| | | | |
|---|---|---|---|
| 8,675,617 B2 | 3/2014 | Cha | |
| 8,902,098 B2 | 12/2014 | Langsford | |
| 9,024,818 B2 * | 5/2015 | Okamoto | H01Q 3/2611 342/383 |
| 9,288,007 B2 | 3/2016 | Jover | |
| 10,014,892 B1 | 7/2018 | Leyh et al. | |
| 2012/0021687 A1 * | 1/2012 | Parker | H01Q 3/2611 455/63.1 |

* cited by examiner

*Primary Examiner* — Cassi J Galt

(57) ABSTRACT

An antenna null steerer in a wireless network determines the conformance of a radio frequency signal received by multiple antennas to the protocol of the wireless network. When the received radio frequency signal is conformant to the protocol, the current antenna pattern is maintained. When the received radio frequency signal is non-conformant to the protocol, nulls are iteratively generated in the antenna pattern until the RF signal becomes conformant to the protocol and/or the maximum number of nulls are present in the antenna pattern.

21 Claims, 5 Drawing Sheets

COMBATTING INTERFERENCE SIGNALS USING NULL STEERING IN WIRELESS COMMUNICATION NETWORKS

RELATED APPLICATION(S)

This application claims the benefit of priority under 35 USC § 119(e) of U.S. Provisional Patent Application No. 63/172,143 filed on Apr. 8, 2021, the contents of which are incorporated by reference as if fully set forth herein in their entirety.

FIELD AND BACKGROUND OF THE INVENTION

The present invention, in some embodiments thereof, relates to combatting jamming and interference signals in a wireless network and, more particularly, but not exclusively, to detecting and combatting jamming and interference signals in wireless networks using null steering.

Wireless communication is an essential aspect of today's technological landscape. The integrity of the wireless communication must be maintained in order to ensure proper operation of wireless communication networks, such as mobile telephone networks, Global Navigation Satellite System (GNSS), Wi-Fi networks and many others.

Jamming is often employed to disrupt wireless communications between transmitters and receivers in wireless networks. The jammers transmit jamming signals which are intended to prevent establishing a communication link between legitimate network transmitters and receivers. Jamming is particularly effective when the signal strength of the received jamming signal is significantly higher than that of a legitimate received radio frequency (RF) signal.

There are a number of known techniques for providing resilience towards network jamming and spoofing. Some networks employ frequency hopping or other redundancy or diversity mechanisms to improve the success of communication. A problem with these mechanisms is that they negatively influence the efficiency of the system. Other diversity mechanisms (such as using more antennas and/or more robust coding) have similar negative impacts because the diversity mechanism(s) could instead be used to improve bit-rates or the capacity of the system. Diversity mechanisms are used to overcome media natural impairment, which behaves different over different paths, frequencies and polarizations. All of these are susceptible to deliberate jamming.

Receivers may employ anti-jamming, anti-spoofing and detection mechanisms, for example by analyzing the contents of received messages or by measuring power levels of received signals. Known network participants may be whitelisted, and messages having a whitelisted IP address are assumed to be legitimate.

A solution is needed to detect and combat attacks on wireless communication systems efficiently, without imposing a large burden on system resources.

Additional Background Art Includes:
1) Mouhamadou, M. & Vaudon, Patrick & Rammal, Mohammad. (2006). Smart Antenna Array Patterns Synthesis: Null Steering and Multi-User Beamforming by Phase Control. Progress in Electromagnetics Research-pier—PROG ELECTROMAGN RES. 60. 95-106. 10.2528/PIER05112801.

SUMMARY OF THE INVENTION

It is an object of the present invention to provide an apparatus, method and computer program product for detecting and protecting against transmissions from illegitimate sources in a wireless network. Embodiments of the invention use null steering in multiple-antenna arrays in order to block interference and jamming signals.

An RF network includes transmitters and receivers (also denoted network nodes) that communicate amongst themselves over a wireless network according to a network protocol. In mobile RF networks at some or all of the transmitters and receivers are mobile, so that their location varies over time.

Wireless network configurations include mesh networks in which network any node may communicate with any other network node and star networks in which there is a master network node (typically stationary) that communicates with the rest of the nodes. Some wireless networks are configured as a combination of star/mesh networks.

In embodiments of the invention, an RF signal received by multiple antennas is processed in order to determine if it conforms to a specific network protocol. If the received signal conforms to the network protocol, processing of the received signal continues. If, however, the received signal does not conform to the network protocol, one or more nulls are created in the pattern of the antenna array until a conformant signal is obtained or the maximum number of nulls have been created in the antenna pattern. If the received signal becomes conformant, processing of the received wireless signal progresses. If the maximum number of nulls has been created in the antenna pattern and the received signal is still not conformant, the received signal is not processed.

This approach is effective against jamming attacks that attempt to overwhelm the capacity of the node's receiver(s) as well as against non-malicious interference from other sources operating in the same frequency band.

According to a first aspect of some embodiments of the present invention there is provided a device for adjusting antenna null steering in a wireless network. The device includes processing circuitry. The processing circuitry:
  determines the conformance of a radio frequency (RF) signal received by multiple antennas to a protocol of the wireless network;
  when the received radio frequency signal is conformant to the protocol, maintains the current antenna pattern of the antennas; and
  when the received radio frequency signal is non-conformant to the protocol, iteratively generates nulls in the antenna pattern until the RF signal becomes conformant to the protocol and/or the maximum number of nulls are present in the antenna pattern.

According to some embodiments of the invention, the device further includes an antenna pattern controller to adjust respective phase shifts and respective amplitudes of the received radio frequency signals in accordance with control signals issued by the processing circuitry.

According to some embodiments of the invention, the device further includes multiple couplers. Each of the couplers inputs a radio frequency signal from a respective antenna and couples the input radio frequency signal in parallel to an RF receiver and to the antenna pattern controller.

According to some embodiments of the invention, the device further includes a memory for storing sequences of samples of the RF signals.

According to a second aspect of some embodiments of the present invention there is provided a method for adjusting antenna null steering in a wireless network. The method includes:

determining a conformance of a radio frequency signal received by multiple antennas to a protocol of the wireless network;

when the received radio frequency signal is conformant to the protocol, maintaining a current antenna pattern of the plurality of antennas; and when the received radio frequency signal is non-conformant to the protocol: iteratively generating nulls in the antenna pattern until the RF signal becomes conformant to the protocol and/or the maximum number of nulls are present in the antenna pattern.

According to some embodiments of the invention, the method further includes coupling radio frequency signals from radio frequency antennas in parallel to an RF receiver and to a respective digitizer. Each of the digitizers converts the respective coupled RF signal into digital data.

According to some embodiments of the invention, the method further includes storing sequences of samples of the RF signals in a memory.

According to a third aspect of some embodiments of the present invention there is provided a non-transitory computer readable medium including instructions that, when executed by at least one processor, cause the at least one processor to perform operations. The operations include:

determining a conformance of a radio frequency (RF) signal received by multiple antennas to a protocol of the wireless network;

when the received radio frequency signal is conformant to the protocol, maintaining a current antenna pattern of the plurality of antennas; and when the received radio frequency signal is non-conformant to the protocol: iteratively generating nulls in the antenna pattern until the RF signal becomes conformant to the protocol and/or the maximum number of nulls are present in the antenna pattern.

According to some embodiments of the first, second and third aspects of the invention, conformance of the RF signal to the protocol is determined by comparing a message extracted from the received radio frequency signal to the protocol.

According to some embodiments of the first, second and third aspects of the invention, conformance of the RF signal to the protocol is determined by sending a request to establish a communication session to a source of the received radio frequency signal and comparing a response of the source to the request to the protocol.

According to some embodiments of the first, second and third aspects of the invention, for each iteration a new null is generated in a direction of an RF signal resulting from the antenna pattern of the preceding iteration.

According to some embodiments of the first, second and third aspects of the invention, processing of the currently-received RF signal is prevented when the RF signal is non-conformant to the protocol.

According to some embodiments of the first, second and third aspects of the invention, the nulls in the antenna pattern are generated by issuing control signals for adjusting respective phase shifts and respective amplitudes applied to RF signals coupled from the antennas.

According to some embodiments of the first, second and third aspects of the invention, respective directions of the nulls are calculated based on an analysis of phase differences between radio frequency signals received by the plurality of antennas.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
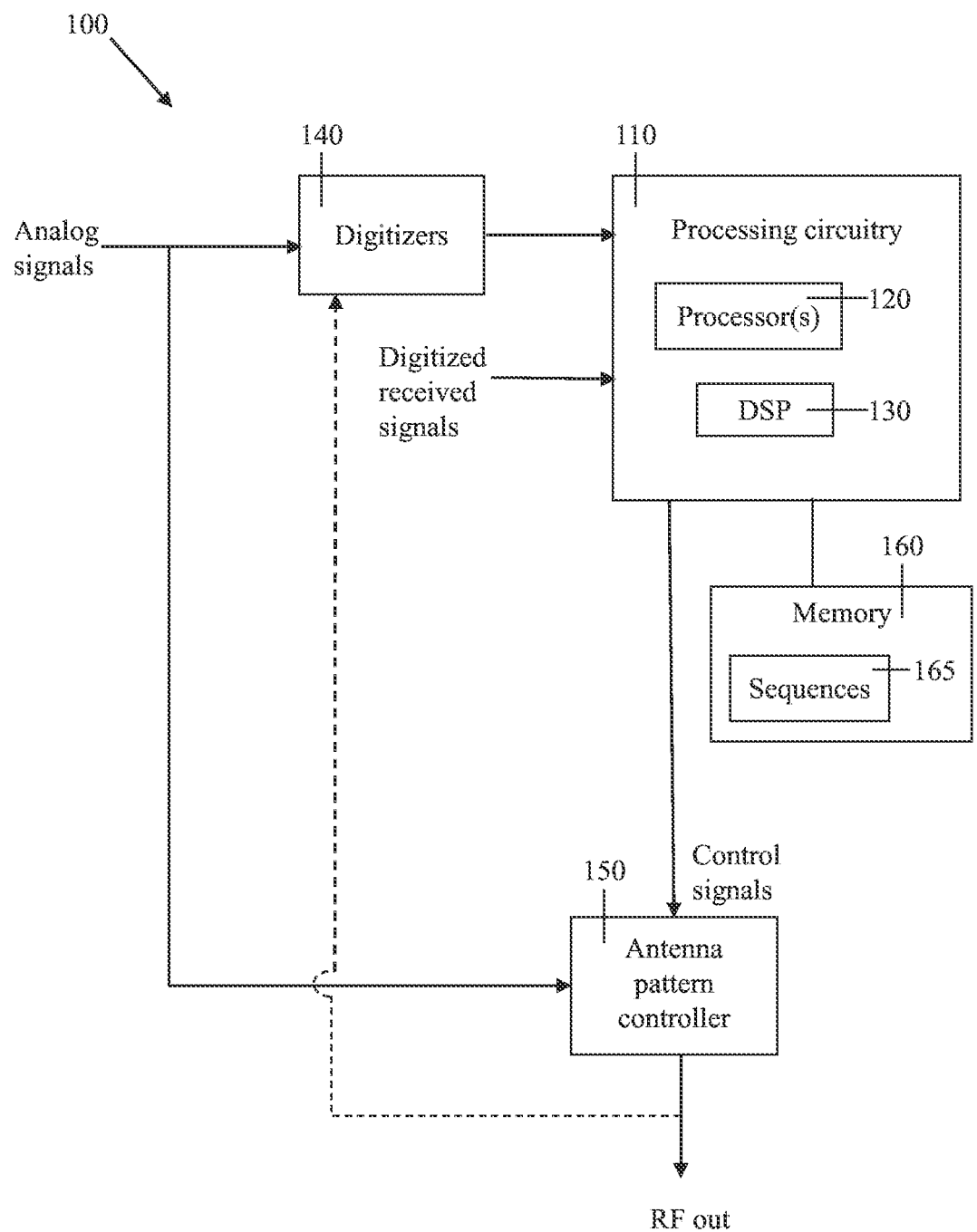
FIG. 1 is a simplified block diagram of a device for adjusting antenna null steering in a wireless network according to some embodiments of the invention.

The present invention, in some embodiments thereof, relates to combatting jamming and interference signals in a wireless network and, more particularly, but not exclusively, to detecting and combatting jamming and interference signals in wireless networks using null steering.

Embodiments of the invention use antenna null steering to combat interfering signals, such as jamming signals, so that legitimate network signals may be received and processed while minimizing the jammers' effect.

Null steering is a technique for controlling the antenna pattern (also denoted a radiation pattern) of an antenna array. For received signals, the antenna pattern refers to the directional dependence of the strength of the received radio waves. The antenna pattern of most antennas includes a pattern of lobes with high signal reception at various angles, separated by nulls in which the signal reception is significantly reduced or eliminated. In an antenna array, the null direction may be controlled by adjusting the respective amplitudes and/or phases of the RF streams output by the antennas before they are summed into a single RF signal.

In embodiments of the invention, a radio frequency (RF) signal is received at a network node with multiple antennas. The received RF signal is processed in order to determine whether it does or does not conform to the required network protocol. If the received RF signal conforms to the network protocol, no change is made to the current antenna pattern. If the received RF signal does not conform to the network protocol, nulls are iteratively added to the antenna pattern. If the null steering is successful, interfering signals are blocked to a level that the received RF signal may be processed. If the maximum number of nulls has been introduced into the antenna pattern and the received RF signal is still non-conformant, the RF signal remains blocked.

As used herein the term "node" is an element of the wireless network that is capable of wireless communication with other network nodes by transmission and/or reception of RF signals. A node may have multiple receivers and/or transmitters and/or transceivers. The receivers and/or transmitters and/or transceivers may all operate with the same network protocol.

As used herein the term "network protocol" means the rules that govern the way that nodes communicate in the wireless network. These rules are typically established in specifications which define all necessary aspects of the communication (such as data formats, address formats, data frame structure, session management, etc.)

As used herein the term "conforms to a network protocol" means that the signal is suitable for communicating over a network operating with the network protocol.

Null(s) may be created in the antenna pattern by adjusting the respective phases and/or amplitudes of RF streams coupled from each of the antennas before they are summed into a single RF signal. Given an array of n antennas, up to n−1 nulls may be created simultaneously.

The calculation of the required phase and/or amplitude changes may be based on direct RF signal analysis or on direct or downconverted and digitized signals. Optionally, the directions towards which the nodes should be directed is calculated by phase interferometer or any other direction finding technique.

Optionally, the nulls are directed towards the n−1 strongest non-conformant transmissions (or fewer than n−1 if the maximum number of nulls is not necessary).

As used herein the term "direct a null" means that a null is created in the combined antennas pattern so that RF signals originating from a given direction are received with high attenuation.

As used herein the term "RF stream" means an electrical RF signal output by an antenna.

Optionally, after phase and/or amplitude adjustment the RF signals are summed and provided to the network node's RF front end. Alternately, after phase and/or amplitude adjustment the RF signals are provided in parallel to an RF receiver. The RF receiver may be the same receiver used to determine conformance of the RF signal or may be a different receiver using the same network protocol.

Embodiments of the invention are not limited to a specific frequency band or communication protocol, but rather may be adapted to the parameters (e.g. frequency band and protocol) of the wireless network. Examples of such communication protocols include but are not limited to:
  a) Wi-Fi (e.g. 2.4 GHz or 5 GHz);
  b) Bluetooth (e.g. type 1, 2, 3 ... );
  c) Cellular communication networks (e.g. Global System for Mobile Communications, CDMA2000, etc.);
  d) Zigbee; and
  e) LoRa (Long Range).

The configuration of the wireless network may be any configuration known in the art. Non-limiting structures of the wireless network structure include a mesh network in which any node may communicate with any other node, a star network in which there is a master node that communicates with the rest of the nodes and combination of star and mesh networks.

The wireless network may be a mobile network (in which some or all of the nodes are mobile) or a stationary network (in which all of the network nodes are in fixed locations).

Types of wireless data networks in which the embodiments described herein may be employed include but are not limited to:
  1) Wi-Fi network;
  2) Bluetooth network;
  3) Wireless local area network (WLAN);
  4) Cellular network; and
  5) Ad-hoc network.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For clarity, some embodiments of the invention describe the non-limiting case in which the received RF signals are being checked for conformance to a single communication protocol. In alternate embodiments, the received RF signals are checked in parallel for conformance to different communication protocols in cases where the network employs multiple protocols.

1. Antenna Null Steerer

Reference is now made to FIG. 1, which is a simplified block diagram of a device for adjusting antenna null steering in a wireless network according to some embodiments of the invention.

Antenna null steerer 100 includes processing circuitry 110 which performs processing operations required to perform null steering, according to any of the embodiments described herein. Processing circuitry 110 may include one or more processors and a non-transitory storage medium carrying instructions for execution, which when executed by the processing circuitry cause it to perform some or all of the tasks described herein. FIG. 1 shows a non-limiting embodiment which includes one or more processors 120 for performing processing operations and memory 160 for storing instructions for execution (and optionally other data).

Optionally, processing circuitry 110 includes digital signal processor (DSP) 130 which performs digital signal processing operations on the digitized signals.

Optionally, antenna null steerer 100 includes a digital interface (not shown) for inputting and outputting digital information (e.g. digitized RF signals, control signals, etc.).

Processing circuitry 110 determines whether the received RF signal conforms to the wireless network protocol. If the RF signal conforms to the network protocol, the current antenna pattern is maintained.

As used herein the term "maintain the current antenna pattern" means that no nulls are added to or removed from the receive antenna pattern (e.g. no changes are made to the respective phase shifts and amplitudes of the coupled RF streams).

Processing circuitry 110 may include one or more hardware components, including but not limited to: field programmable gate arrays (FPGAs), application-specific integrated circuits (ASICs), system-on-a-chip systems (SOCs), general-purpose microprocessors, microcontrollers and digital signal processors (DSPs).

If the received RF signal is non-conformant to the network protocol, processing circuitry 110 iteratively generates nulls in the antenna pattern in the direction of the received transmissions. The received signal continues to be analyzed for conformance with the protocol as the nulls are added. This process continues until the received signal conforms to the network protocol (i.e. interfering signals have been successfully combatted). If the maximum number of nulls has been reached and the received signal still does not conform to the network protocol, processing of the received signal may be halted until a conformant signal is reestablished.

As used herein the term "iteratively generates nulls in the antenna pattern" means that the number of nulls is increased with each iteration until the maximum number of null have been added to the antenna pattern. The respective phases and amplitudes are recalculated to obtain an antenna with the desired number of nulls in the desired directions.

Optionally, processing circuitry 110 issues an indicator when the maximum number of nulls have been generated in the antenna pattern and the signal is still non-conformant. The indicator may trigger actions in other components of antenna null steerer 100 and/or a system in which it is embedded. Alternately or additionally, the indicator is output to an external device, for example to a user interface that alerts a user that there is difficulty processing the received RF signal.

In some embodiments, a message is extracted from the received RF signal. The received signal is considered to be conformant to the network protocol if the extracted message conforms to a message structure permitted by the network protocol. Alternately or additionally, a request to establish a communication session is sent to the source of the received transmission. If a communication session is established successfully, the received signal is considered to be conformant to the network protocol.

Optionally, sequences of samples of the digitized RF signals are stored in memory. The stored sequences may be used later by processing circuitry 110 in order to calculate new node directions without continuously changing the data being used for the calculation based on the real-time RF signals.

The sequences may be stored in any memory that is accessible to processing circuitry 110, including but not limited to:

1) A memory module within processing circuitry 210;

2) An internal memory in antenna null steerer 100; and
3) An external memory.

Optionally, antenna null steerer 100 includes or is connected to at least one RF receiver operating with the network protocol. In order to determine conformance, an RF receiver attempts to extract the message from the RF signal and if a message is extracted compares it to the requirements of the network protocol. If a message cannot be extracted or the format and/or contents of the extracted message are incorrect, the RF receiver indicates that the received signal is non-conformant.

Optionally, the received signals are provided to antenna null steerer 100 as digital signals after analog-to-digital (A/D) conversion. Alternately or additionally, processing circuitry includes digitizers 140 which converts input analog signals into digital signals by sampling and A/D conversion.

Optionally, antenna null steerer 100 includes a frequency converter (not shown) which performs frequency conversion on the analog input signals. For example the RF signals may be converted to IF or baseband prior to sampling and A/D conversion.

Antenna null steerer 100 optionally includes one or more additional RF and/or digital processing elements (not shown in FIG. 1). These RF and/or digital processing elements may include but are not limited to:

1) Couplers—Each of the couplers couples an RF stream input from a respective antenna to at least two RF signal processing elements;
2) One or more RF receivers—May extract messages from a received RF signal and/or to process the RF signal output by an antenna pattern controller as described below; and
3) RF switch—May be used to bypass the antenna pattern controller when a received RF signal is conformant to the network pattern in a no-null antenna pattern.

An exemplary embodiment including all of these components is described below in reference to FIGS. 3A-3B.

As used herein the term "RF signal processing element" means a hardware element capable of inputting an RF signal, processing the RF signal and outputting an analog and/or digital signal resulting from processing the RF signal.

I.a. Null Steering

Optionally, processing circuitry 110 controls the antenna pattern by issuing control signals to antenna pattern controller 150. Optionally, antenna pattern controller 150 is external to antenna null steerer 100. Alternately, antenna pattern controller 150 is integrated into antenna null steerer 100.

The control signals include control parameter values (such as phase shifts and amplitude levels) so that all of the desired nulls are created in the antenna pattern. As nulls are added to and dropped from the antenna pattern, processing circuitry 110 updates the control signals to antenna pattern controller 150.

Antenna pattern controller 150 adjusts the respective phase shifts and/or respective amplitudes of the coupled RF signals based on the control signals. Antenna pattern controller 160 outputs the adjusted RF signal(s), either before or after combining them into a single RF signal.

Optionally, antenna pattern controller 150 includes an array of controllable phase shifters and variable gain amplifiers (and/or variable attenuators). The phase and amplitude of each RF signal are adjusted by controlling the RF signal's respective phase shifter and variable gain amplifier (or variable attenuator).

Optionally, for each iteration the new null is added to the antenna pattern in the direction of the signal which results from the antenna pattern of the preceding iteration. During the first iteration the null is generated in the direction of the received RF signal. Further optionally, the resultant RF signal used for the next iteration is obtained by processing stored sequences of samples of the received RF signals.

Optionally, if the maximum number of nulls has been reached and the received signal still does not conform to the network protocol, information about the non-conformant signal is stored in memory 160 (or any other memory accessible by processing circuitry 110). This information may be used by processing circuitry 110 later, for example in order to alert the communication network node about a jamming situation.

Optionally, the stored information includes but is not limited to one or more of:
a) Sequences of samples of the RF signals for further analysis.
b) Information about the direction of the source of the received signal;
c) Characteristics of the RF signal (such as amplitude, SNR, etc.).

2. First Exemplary Embodiment of a Null Steering Adjuster

Figure 2:
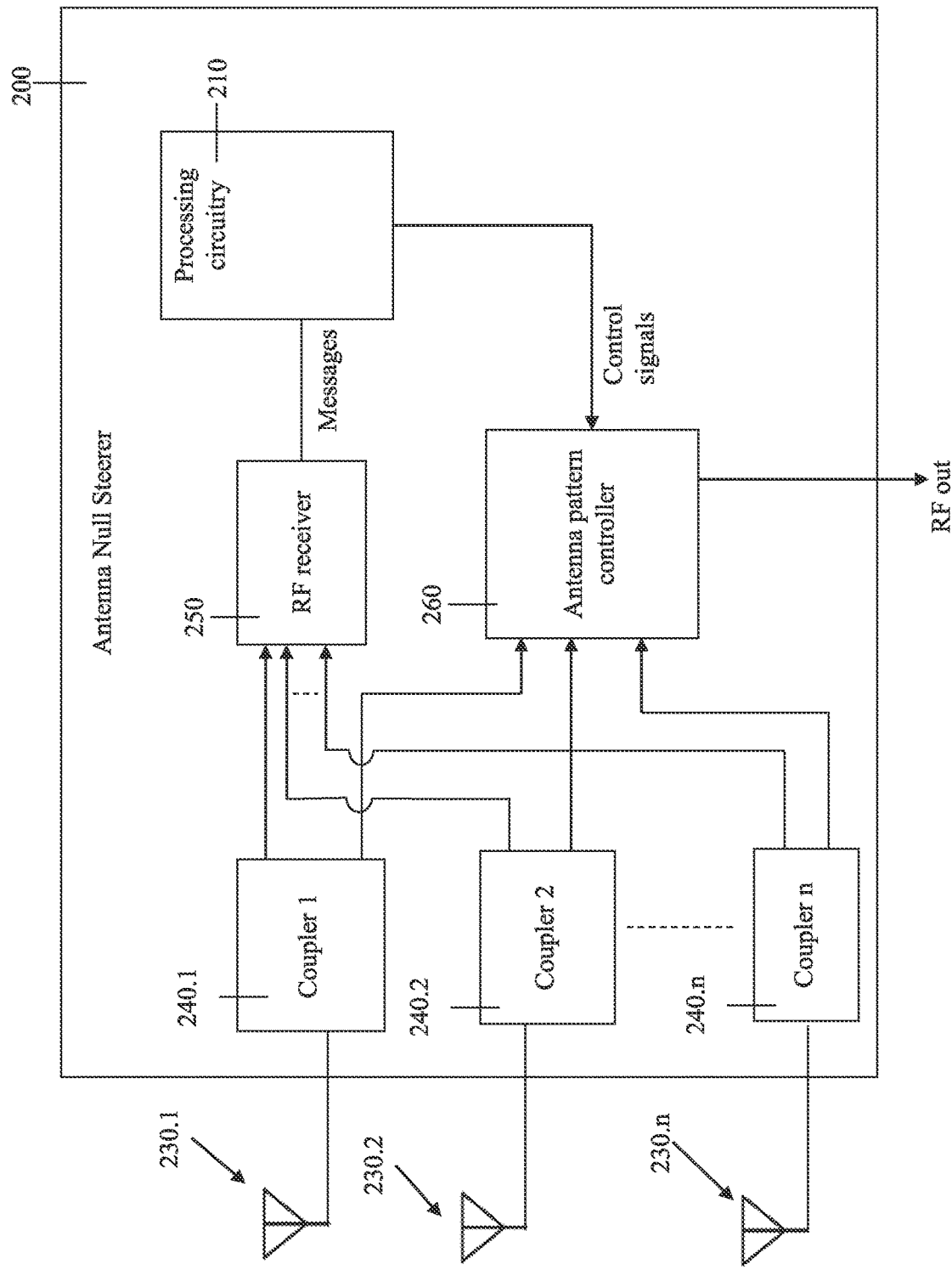
FIG. 2 is a simplified block diagram of a device for adjusting antenna null steering in a wireless network according to a first exemplary embodiment of the invention.

Reference is now made to FIG. 2, which is a simplified block diagram of a device for adjusting antenna null steering in a wireless network according to a first exemplary embodiment of the invention.

RF streams from antennas 230.1-230.*n* are input to respective couplers 240.1-240.*n*. Each coupler splits its respective RF signal and provides the signals in parallel to RF receiver 250 and to antenna pattern controller 260. Typically more of the signal power is coupled to antenna pattern controller 160 than to phase difference detector 150.

RF receiver 250 processes the multiple RF signals coupled from one of antennas 230.1-230.*n* and attempts to extract messages from the RF signals in accordance with the network protocol. If a message cannot be extracted, the received RF signal is non-conformant. If a message has been extracted from the received RF signal, processing circuitry 210 checks the message and determines whether the message itself conforms to the network protocol.

If the received signal conforms to the network protocol, processing circuitry 210 does not change the antenna pattern.

If the message does not conform to the network protocol, processing circuitry 210 calculates the desired null directions and updates the control signals to antenna pattern controller 260.

Antenna pattern controller 260 adjusts the phase and/or amplitude of the coupled RF signals in accordance with the control signals from processing circuitry 210. Optionally, antenna pattern controller 260 combines the RF signals (after phase and/or amplitude adjustment) before outputting them. In alternate embodiments (not shown), multiple RF signals are output in parallel to an RF receiver (either the same or different than RF receiver 250) which combines them internally.

3. Second Exemplary Embodiment of a Null Steering Adjuster

Figure 3A:
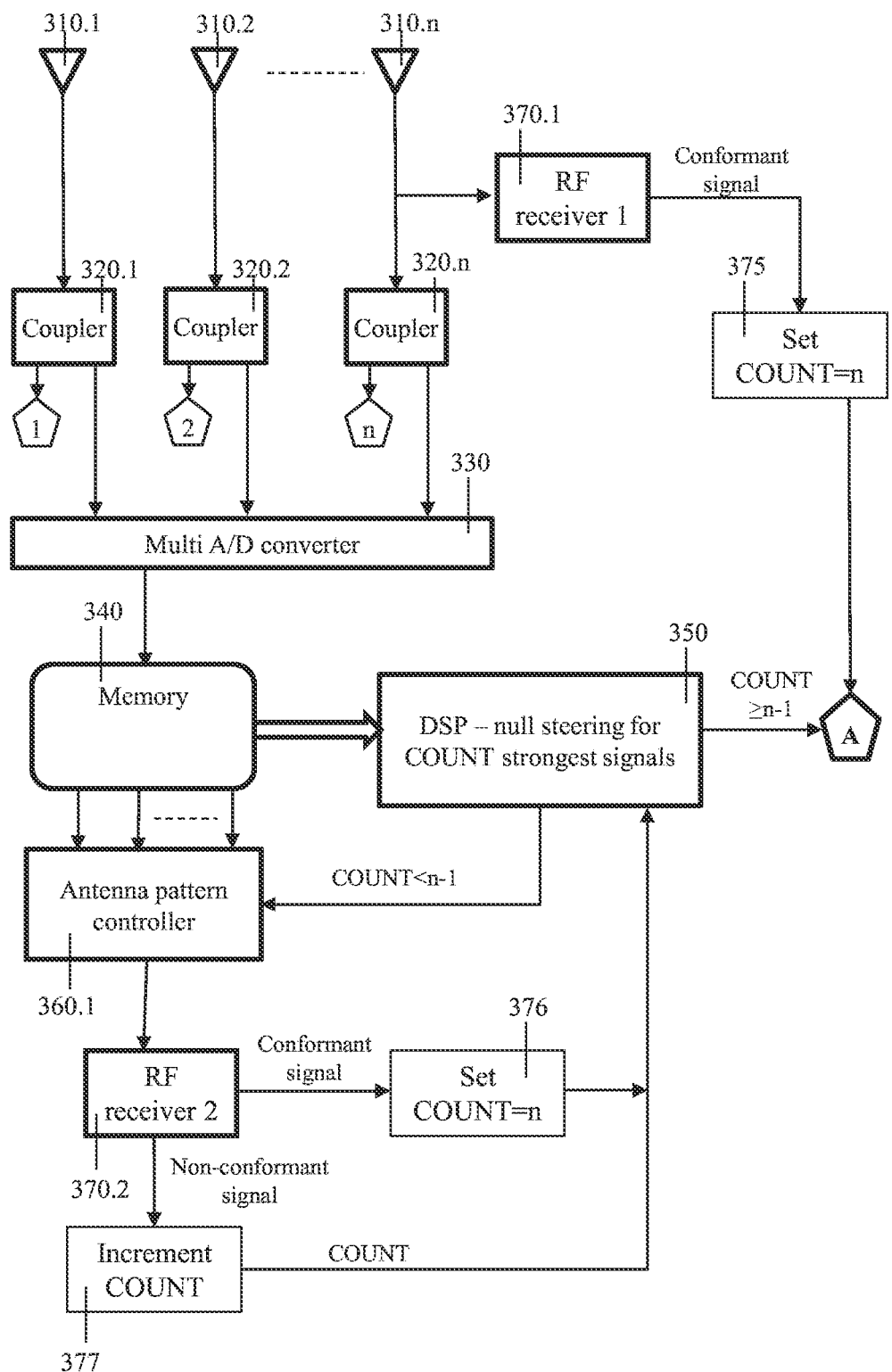
FIGS. 3A-3B together are a simplified block diagram of a device for adjusting antenna null steering in a wireless network, according to a second exemplary embodiment of the invention.
Figure 3B:
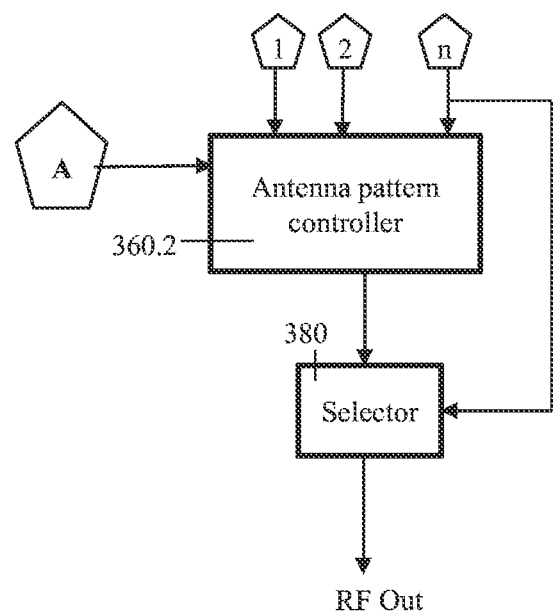

Reference is now made to FIGS. 3A-3B, which together are a simplified block diagram of a device for adjusting antenna null steering in a wireless network, according to a second exemplary embodiment of the invention. In the embodiment of FIGS. 3A-3B, phase difference detection is performed by digital signal processing after the RF signals coupled from the antennas are converted into digital signals. FIGS. 3A-3B also illustrate the logic flow for maintaining a count of the number of nulls that are being created in the antenna pattern.

Couplers 320.1-320.*n* input RF streams from respective antennas 310.1-320.*n*. Each coupler couples the respective RF stream to Multi A/D converter 330 and to antenna pattern controller 360.1.

Multi A/D converter 330 converts each of the coupled RF signals to digital form and stores sequences of the digitized signals and/or other information derived from the RF signals in internal memory 340.

DSP 350 performs signal processing operations on the stored sequences of the digitized signals in order to generate control signals for antenna pattern controller 360.2. The number of nulls generated is determined by the value of COUNT. The nulls are directed towards the strongest non-conformant signals.

Alternately or additionally, multi A/D converter 330 provides the digitized signals directly to DSP 350 for processing.

Signal processing operations performed by DSP 350 may include but are not limited to:
1) Determining the phase differences between the digitized RF signals and forming phase difference vectors;
2) Maintaining a count of the nulls present in the antenna path;
3) Calculating the phase shift and amplitude levels to create nulls in the antenna pattern in the desired direction(s), where the number of nulls is the value of COUNT; and
4) Outputting the control signals.
5) Storing sequences of the digitized signals in memory 340.

RF receivers 370.1 and 370.2 are both used to determine if a received signal conforms to protocol. RF receiver 1 370.1 processes the RF streams from antennas 310.1-310.*n*. If the received signal is conformant at this point, COUNT is set to n (375) and no adjustment is made to the antenna pattern. RF receiver 2 370.2 processes the RF signals at the output of antenna pattern controller 360.1. If the received signal is conformant at this point, COUNT is set to n (376) and no further adjustment is made to the antenna pattern. However, if the received signals are non-conformant COUNT is incremented (377).

Antenna pattern controller 360.2 performs phase and amplitude adjustment of the RF streams coupled from antennas 310.1-310.*n*, with the same respective settings as antenna pattern controller 360.1. Antenna pattern controller 360.2 combines the adjusted signals and outputs the combined RF signal to selector 380.

If the COUNT is greater than or equal to n−1 at connector A, the received signal is conformant (as determined by one of the RF receivers) and the RF signal is output. If the COUNT is less than n−1 and the RF signal is still non-conformant, nulls are added iteratively until the received signal becomes valid.

The signal from one of antennas 310.1-320.*n* is also coupled to selector 380 which functions as a bypass switch, selecting which RF signal will be output. If no nulls are being created in the receive antenna pattern, antenna pattern controller 360.2 may be bypassed and selector 380 outputs the coupled RF stream. If nulls are being created in the receive antenna pattern, selector 380 outputs the RF signal(s).

4. Method of Adjusting Antenna Null Steering in a Wireless Network

Figure 4:
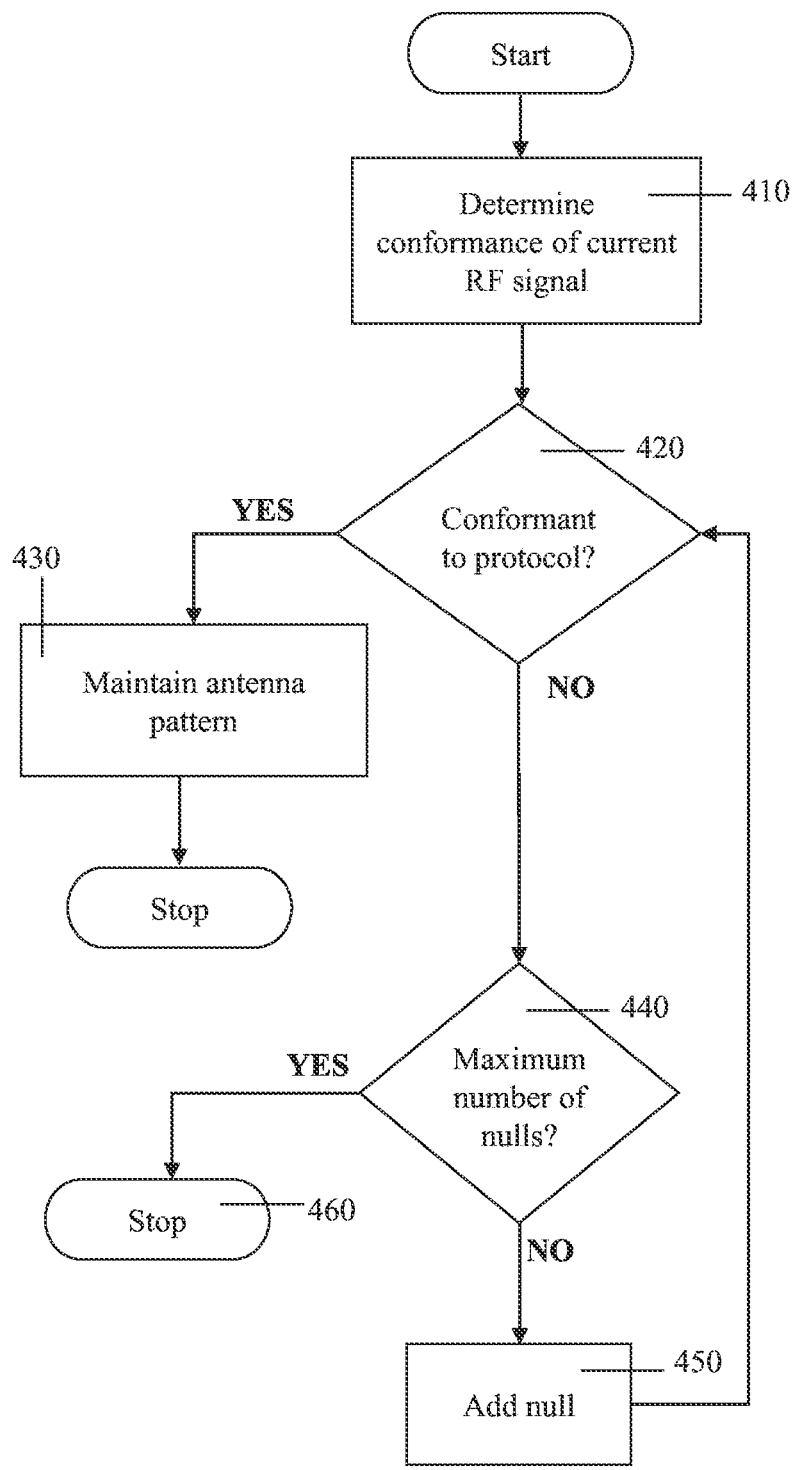
FIG. 4 is a simplified flowchart of a method for adjusting antenna null steering in a wireless network, according to some embodiments of the invention.

Reference is now made to FIG. 4 which is a simplified flowchart of a method for adjusting antenna null steering in a wireless network, according to some embodiments of the invention.

In 410, an RF signal received by multiple antennas is checked to determine if it conforms to the wireless network protocol.

If, in 420, the received RF signal conforms to the protocol, in 430 the current antenna pattern is maintained.

If, in 420, the received RF signal does not conform to the protocol, in 440 the number of nulls currently being generated in the antenna pattern is compared to the maximum. If the maximum number of nulls is not being generated in the antenna pattern, in 450 another null is added to the antenna pattern. Nulls continue to be added to the antenna pattern iteratively until the received signal becomes conformant or the maximum number of nulls has been generated.

If the maximum number of nulls has been reached and the received signal still does not conform to the network protocol, in 460 the process is stopped.

Optionally, processing of the RF signal is prevented when the maximum number of nulls has been reached and the received signal still does not conform to the network protocol. Processing may resume when the RF signal becomes conformant or may be reinitiated after a short timeout.

Optionally conformance of the RF signal to the network protocol is determined by comparing a message extracted from the currently-received RF signal to the protocol.

Generating nulls in the antenna pattern may be performed by any means known in the art.

Determining the direction towards which the null should be directed may be performed by any means known in the art. In some embodiments the direction is determined by analyzing phase differences between the RF signals received at the multiple antennas. The phase difference between each pair of antennas may be detected by digital or analog signal processing.

Optionally, the method further includes storing sequences of the digitized RF or downconverted RF signals in a memory. The same sequence may be used to calculate the directions of the nulls, reducing the processing load that is incurred when real-time signals are used for each iteration The embodiments presented herein provide a technique for using antenna null steering to block transmissions within the network RF band which do not conform to a desired network protocol. Received RF signals which do not conform to the network protocol are blocked or reduced by directing antenna pattern nulls in the direction of undesired sources. The direction of the source of the non-conformant signals may be determined by analyzing the phase differences between signals received by multiple antennas. Both phase difference detection and antenna pattern control may be performed extremely rapidly and require limited processing resources, making the claimed embodiments an effective technique for combatting jamming attacks and non-malicious interference signals.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant antennas, RF receivers, RF signals, network protocols, processing circuitry, couplers, A/D converters, phase shifters, digital signal processors, memories and controllers for adjusting respective phases and/or amplitudes of RF signals, will be developed and the scope of the term antenna, RF receiver, RF signal, network protocol, processing circuitry, A/D converter, phase shifter, digital signal processor, memory and antenna pattern controller is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for adjusting antenna null steering in a wireless network, comprising:
   a processing circuitry configured to:
   determine a conformance of a radio frequency (RF) signal received by a plurality of antennas to a protocol of said wireless network;
   when said received radio frequency signal is conformant to said protocol, maintain a current antenna pattern of said plurality of antennas; and
   when said received radio frequency signal is non-conformant to said protocol:
   iteratively generate nulls in said antenna pattern until at least one of:
      said RF signal becomes conformant to said protocol; and
      a maximum number of nulls are present in said antenna patter,
   wherein said processing circuitry is configured to determine said conformance by sending a request to establish a communication session to a source of said received radio frequency signal and comparing a response of said source to said request to said protocol.

2. A device according to claim 1, wherein said processing circuitry is configured to determine said conformance by comparing a message extracted from said received radio frequency signal to said protocol.

3. A device according to claim 1, wherein for each iteration a new null is generated in a direction of an RF signal resulting from an antenna pattern of a preceding iteration.

4. A device according to claim 1, wherein said processing circuitry is configured to prevent processing of said currently-received RF signal when said RF signal is non-conformant to said protocol.

5. A device according to claim 1, wherein said processing circuitry is configured to generate said nulls in said antenna pattern by issuing control signals for adjusting respective phase shifts and respective amplitudes applied to RF signals coupled from said antennas.

6. A device according to claim 1, further comprising an antenna pattern controller configured to adjust respective phase shifts and respective amplitudes of said received radio frequency signals in accordance with control signals issued by said processing circuitry.

7. A device according to claim 6, further comprising a plurality of couplers, each of said couplers being configured to input a radio frequency signal from a respective antenna and to couple said input radio frequency signal in parallel to an RF receiver and to said antenna pattern controller.

8. A device according to claim 1, wherein said processing circuitry is further configured to calculate respective directions of said nulls based on an analysis of phase differences between radio frequency signals received by said plurality of antennas.

9. A device according to claim 1, further comprising a memory configured to store sequences of samples of said RF signals.

10. A method for adjusting antenna null steering in a wireless network, comprising:
    determining a conformance of a radio frequency (RF) signal received by a plurality of antennas to a protocol of said wireless network;
    when said received radio frequency signal is conformant to said protocol, maintaining a current antenna pattern of said plurality of antennas; and
    when said received radio frequency signal is non-conformant to said protocol:
    iteratively generating nulls in said antenna pattern until at least one of:
    said RF signal becomes conformant to said protocol;
    a maximum number of nulls are present in said antenna pattern; and
       determining said conformance by sending a request to establish a communication session to a source of said currently-received radio frequency signal and comparing a response of said source to said request to said protocol.

11. A method according to claim 10, further comprising determining said conformance by comparing a message extracted from said received radio frequency signal to said protocol.

12. A method according to claim 10, wherein for each iteration a new null is generated in a direction of an RF signal resulting from an antenna pattern of a preceding iteration.

13. A method according to claim 10, further comprising preventing processing of said currently-received RF signal when said RF signal is non-conformant to said protocol.

14. A method according to claim 10, wherein said generating nulls in said antenna pattern comprises issuing control signals for adjusting at least one of respective phase shifts and respective amplitudes of RF signals coupled from said antennas.

15. A method according to claim 10, further comprising calculating respective directions of said nulls based on an analysis of at least one set of phase differences between radio frequency signals received by said plurality of antennas.

16. A method according to claim 10, further comprising storing sequences of samples of said RF signals in a memory.

17. A method for adjusting antenna null steering in a wireless network, comprising:
    determining a conformance of a radio frequency (RF) signal received by a plurality of antennas to a protocol of said wireless network;
    when said received radio frequency signal is conformant to said protocol, maintaining a current antenna pattern of said plurality of antennas; and
    when said received radio frequency signal is non-conformant to said protocol:
    iteratively generating nulls in said antenna pattern until at least one of:
    said RF signal becomes conformant to said protocol;

a maximum number of nulls are present in said antenna pattern; and coupling radio frequency signals from radio frequency antennas in parallel to an RF receiver and to a respective digitizer, each of said digitizers being configured to convert said respective coupled RF signal into digital data.

18. A non-transitory computer readable medium including instructions that, when executed by at least one processor, cause said at least one processor to perform operations comprising:

determining a conformance of a radio frequency (RF) signal received by a plurality of antennas to a protocol of a wireless network;

when said received radio frequency signal is conformant to said protocol, maintaining a current antenna pattern of said plurality of antennas; and when said received radio frequency signal is non-conformant to said protocol:

iteratively generate nulls in said antenna pattern until at least one of:

said RF signal becomes conformant to said protocol; and a maximum number of nulls are present in said antenna pattern; and determining said conformance by sending a request to establish a communication session to a source of said currently-received radio frequency signal and comparing a response of said source to said request to said protocol.

19. A non-transitory computer readable medium according to claim 18, wherein for each iteration a new null is generated in a direction of an RF signal resulting from an antenna pattern of a preceding iteration.

20. A non-transitory computer readable medium according to claim 18, wherein said operations further comprise determining said conformance by comparing a message extracted from said currently-received radio frequency signal to said protocol.

21. A non-transitory computer readable medium according to claim 18, wherein said operations further comprise preventing processing of said currently-received RF signal when said RF signal is non-conformant to said protocol.

* * * * *